US012463516B2

(12) United States Patent
Iwata et al.

(10) Patent No.: US 12,463,516 B2
(45) Date of Patent: Nov. 4, 2025

(54) ROTATING DEVICE

(71) Applicant: MINEBEA MITSUMI Inc., Nagano (JP)

(72) Inventors: Hitoshi Iwata, Nagano (JP); Tsuyoshi Kano, Nagano (JP); Naoki Ohsawa, Nagano (JP); Shoma Yamanishi, Nagano (JP); Toshiyuki Nishikata, Nagano (JP); Seiji Mitamura, Nagano (JP); Michihiro Shimizu, Nagano (JP); Yuta Amagi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 174 days.

(21) Appl. No.: 17/597,966

(22) PCT Filed: Aug. 6, 2020

(86) PCT No.: PCT/JP2020/030114
§ 371 (c)(1),
(2) Date: Jan. 31, 2022

(87) PCT Pub. No.: WO2021/029309
PCT Pub. Date: Feb. 18, 2021

(65) Prior Publication Data
US 2022/0316487 A1    Oct. 6, 2022

(30) Foreign Application Priority Data
Aug. 9, 2019    (JP) .................... 2019-147928

(51) Int. Cl.
*H02K 21/22*    (2006.01)
*F16C 19/04*    (2006.01)
(Continued)

(52) U.S. Cl.
CPC ............. *H02K 21/22* (2013.01); *F16C 19/04* (2013.01); *F16C 19/546* (2013.01); *H02K 1/27* (2013.01);
(Continued)

(58) Field of Classification Search
CPC ........... H02K 16/04; H02K 1/27; H02K 21/22
(Continued)

(56) References Cited

U.S. PATENT DOCUMENTS 2,179,341 A * 11/1939 Mueller .................... H02K 9/06
310/63
4,788,464 A * 11/1988 Nishikawa ......... G11B 19/2009
310/43
(Continued)

FOREIGN PATENT DOCUMENTS

JP    50-117308 U    9/1975
JP    2003-009487 A    1/2003
(Continued)

OTHER PUBLICATIONS

International Search Report for corresponding International Application No. PCT/JP2020/030114 mailed Oct. 6, 2020.
(Continued)

*Primary Examiner* — Alexander Talpalatski
(74) *Attorney, Agent, or Firm* — Chrisman Gallo Tochtrop LLC

(57) ABSTRACT

A rotating body is shorter in radial direction than in axial direction. The inner circumferential surfaces of a first bearing and a second bearing are fixed at an outer circumferential surface of the shaft member. In the axial direction, the outer diameter of the shaft member is substantially the same from a part, of the shaft member, opposing the first bearing to a part, of the shaft member, opposing the second bearing, and the inner and outer diameters of the rotating body are (Continued)

substantially the same from an end part, of the rotating body, on the first bearing side to an end part, of the rotating body, on the second bearing side. In the axial direction, one of stators is disposed at a central part (C1) of the shaft member, one of magnets is disposed at a central part (C2) of the rotating body.

21 Claims, 4 Drawing Sheets

(51) Int. Cl.
*F16C 19/54* (2006.01)
*H02K 1/27* (2022.01)
*H02K 7/00* (2006.01)
*H02K 7/08* (2006.01)
*H02K 16/04* (2006.01)

(52) U.S. Cl.
CPC ............... *H02K 7/003* (2013.01); *H02K 7/08* (2013.01); *H02K 16/04* (2013.01)

(58) Field of Classification Search
USPC .......................................................... 310/63
See application file for complete search history.

(56) References Cited

U.S. PATENT DOCUMENTS

| | | | |
|---|---|---|---|
| 5,452,156 A * | 9/1995 | Uda | G01B 7/312 |
| | | | 360/99.19 |
| 6,031,310 A * | 2/2000 | Ishikawa | H02K 1/2791 |
| | | | 156/218 |
| 6,447,272 B2 * | 9/2002 | Tsuchiya | H02K 1/28 |
| | | | 417/423.1 |
| 2006/0170294 A1 * | 8/2006 | Du | H02K 5/207 |
| | | | 310/58 |

FOREIGN PATENT DOCUMENTS

| | | |
|---|---|---|
| JP | 2004064800 A * | 2/2004 |
| JP | 2012-186956 A | 9/2012 |
| JP | 2017-017912 A | 1/2017 |
| JP | 2017-063524 A | 3/2017 |
| JP | 2017-195690 A | 10/2017 |

OTHER PUBLICATIONS

Written Opinion for corresponding International Application No. PCT/JP2020/030114 dated Oct. 6, 2020 and English translation.
International Preliminary Report on Patentability for corresponding International Application No. PCT/JP2020/030114 dated Feb. 8, 2022.
First Office Action dated Nov. 26, 2024 for corresponding Japanese Application No. 2023-187425 and English translation.

* cited by examiner

ROTATING DEVICE

TECHNICAL FIELD

The present invention relates to a rotating device.

BACKGROUND ART

Conventionally, various types of a rotating device (a collective designation of motors themselves and devices utilizing rotation generated by a motor) have been developed, manufactured, and used. Of those, there is a strong demand for high-speed rotation and downsizing in a rotating device used as an air blowing device. Further, there is also a demand for high torque and downsizing in various other applications. In other words, there is a desire for a small rotating device capable of achieving high performance as a rotating device.

CITATION LIST

Patent Literature

Patent Document 1: JP 2004-64800 A

SUMMARY OF INVENTION

Technical Problem

Accordingly, an object of the present invention is to provide a rotating device capable of satisfying the demand for downsizing.

Solution to Problem

The above problems are solved by the present invention described below. Specifically, a rotating device according to an aspect of the present invention includes a shaft member as a stationary part, a tubular rotating body rotatable with respect to the shaft member, a first bearing and a second bearing supporting the rotating body with respect to the shaft member, a single stator or a plurality of stators provided at an inner side of the rotating body, and a single tubular magnet or a plurality of tubular magnets fixed at an inner circumferential surface of the rotating body. The magnet is formed of a resin. A length of the rotating body in a radial direction is shorter than a length of the rotating body in an axial direction. Inner circumferential surfaces of the first bearing and the second bearing are fixed at an outer circumferential surface of the shaft member. The shaft member and the rotating body are each formed of a single member. An outer diameter of the shaft member is substantially the same in the axial direction from a part, of the shaft member, opposing the first bearing to a part, of the shaft member, opposing the second bearing. An inner diameter and an outer diameter of the rotating body are each substantially the same in the axial direction from an end part of the rotating body on the first bearing side to an end part of the rotating body on the second bearing side. The single stator or one of the plurality of stators is disposed at a central part of the shaft member in the axial direction. The single magnet or one of the plurality of magnets is disposed at a central part of the rotating body in the axial direction. The first bearing and the second bearing are disposed at both the end part sides of the rotating body.

At the rotating device according to the aspect of the present invention, a single opening or a plurality of openings penetrating the rotating body from inside to outside may be provided at an outer circumferential surface of the rotating body, and in this case, at least one of the plurality of openings is preferably provided between the magnet and the first bearing in the axial direction. Further, when the plurality of openings are provided at the outer circumferential surface of the rotating body, at least one of the plurality of openings is preferably provided between the magnet and the second bearing in the axial direction.

At the rotating device according to the aspect of the present invention, a single rotor blade or a plurality of rotor blades may be provided at the inner side of the rotating body, and further, when the plurality of rotor blades are provided, the stator is preferably disposed between the plurality of rotor blades in the axial direction of the shaft member. Further, at least a part of the single rotor blade or one of the plurality of rotor blades may oppose the first bearing in the axial direction of the shaft member. Furthermore, the rotor blade may be disposed between the first bearing and the second bearing in the axial direction of the shaft member.

At the rotating device according to the aspect of the present invention, outer circumferential surfaces of the first bearing and the second bearing may be fixed at an inner circumferential surface of the rotating body.

At the rotating device according to the aspect of the present invention, the rotating body may be formed of a member made of a non-magnetic material, or may be formed of a metal member.

At the rotating device according to the aspect of the present invention, the number of the plurality of stators and the number of the plurality of magnets may be each an odd number, the plurality of stators may be lined at the shaft member in the axial direction at equal intervals, one of the plurality of stators being disposed at the central part of the shaft member, and the plurality of magnets may be lined at the rotating body in the axial direction at equal intervals, one of the plurality of magnets being disposed at the central part of the rotating body.

Further, at the rotating device according to the aspect of the present invention, the number of the stators may be a plurality, and coils of the plurality of stators may be electrically connected in parallel.

Further, at the rotating device according to the aspect of the present invention, a preload may act on an inner circumferential ring of one of the first bearing and the second bearing in a direction toward the other of the first bearing and the second bearing, the inner circumferential ring being fixed at the shaft member.

On the other hand, a rotating device according to another aspect of the present invention includes a shaft member as a stationary part, a tubular rotating body rotatable with respect to the shaft member, a first bearing and a second bearing supporting the rotating body with respect to the shaft member, a plurality of stators provided at an inner side of the rotating body, and a plurality of tubular magnets fixed at an inner circumferential surface of the rotating body. The tubular magnet is formed of a resin. A length of the rotating body in a radial direction is shorter than a length of the rotating body in an axial direction. Inner circumferential surfaces of the first bearing and the second bearing are fixed at an outer circumferential surface of the shaft member. The shaft member and the rotating body are each formed of a single member. An outer diameter of the shaft member is substantially the same in the axial direction from a part, of the shaft member, opposing the first bearing to a part, of the shaft member, opposing the second bearing. An inner diameter and an outer diameter of the rotating body are each substantially the same in the axial direction from an end part of the rotating body on the first bearing side to an end part of the rotating body on the second bearing side. Two of the plurality of stators are disposed at both sides of a central part of the shaft member in the axial direction. Two of the plurality of magnets are disposed at both sides of a central part of the rotating body in the axial direction. The first bearing and the second bearing are disposed at both the end part sides of the rotating body.

At the rotating device according to the other aspect of the present invention, a single rotor blade or a plurality of rotor blades may be provided at the inner side of the rotating body, and further, when the plurality of rotor blades are provided, the stator is preferably disposed between the plurality of rotor blades in the axial direction of the shaft member. Further, at least a part of the single rotor blade or one of the plurality of rotor blades may oppose the first bearing in the axial direction of the shaft member. Furthermore, the rotor blade may be disposed between the first bearing and the second bearing in the axial direction of the shaft member.

At the rotating device according to the other aspect of the present invention, outer circumferential surfaces of the first bearing and the second bearing may be fixed at an inner circumferential surface of the rotating body.

At the rotating device according to the other aspect of the present invention, the rotating body may be formed of a member made of a non-magnetic material, or may be formed of a metal member.

At the rotating device according to the other aspect of the present invention, the number of the plurality of stators and the number of the plurality of magnets may be each an even number, the plurality of stators may be lined at the shaft member in the axial direction at equal intervals, and the plurality of magnets may be lined at the rotating body in the axial direction at equal intervals.

Further, coils of the plurality of stators are electrically connected in parallel.

At the rotating device according to the other aspect of the present invention, a single opening or a plurality of openings penetrating the rotating body from inside to outside may be provided at an outer circumferential surface of the rotating body, and in this case, at least one of the plurality of openings is preferably provided between the magnet and the first bearing in the axial direction. Further, when the plurality of openings are provided at the outer circumferential surface of the rotating body, at least one of the plurality of openings is preferably provided between the magnet and the second bearing in the axial direction.

Further, at the rotating device according to the other aspect of the present invention, a preload may act on an inner circumferential ring of one of the first bearing and the second bearing in a direction toward the other of the first bearing and the second bearing, the inner circumferential ring being fixed at the shaft member.

The rotating device according to the present invention may include a blade attached at the outer circumferential surface of the rotating body.

DESCRIPTION OF EMBODIMENTS

Rotating devices according to embodiments of the present invention will be described below with reference to the drawings.

First Embodiment

Figure 1:
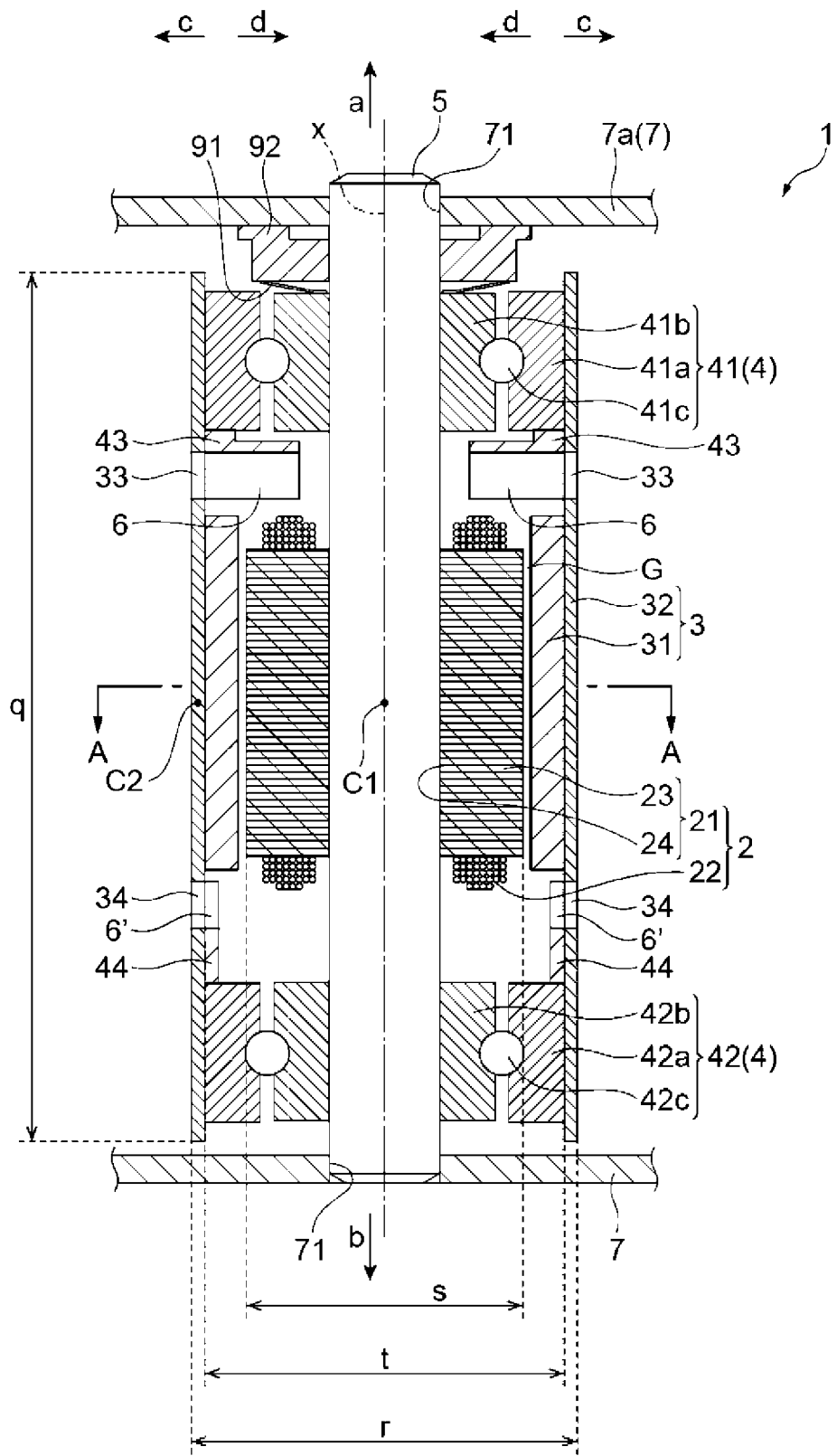
FIG. 1 is a vertical cross-sectional view of a rotating device according to a first embodiment, which is an example of the present invention.
Figure 2:
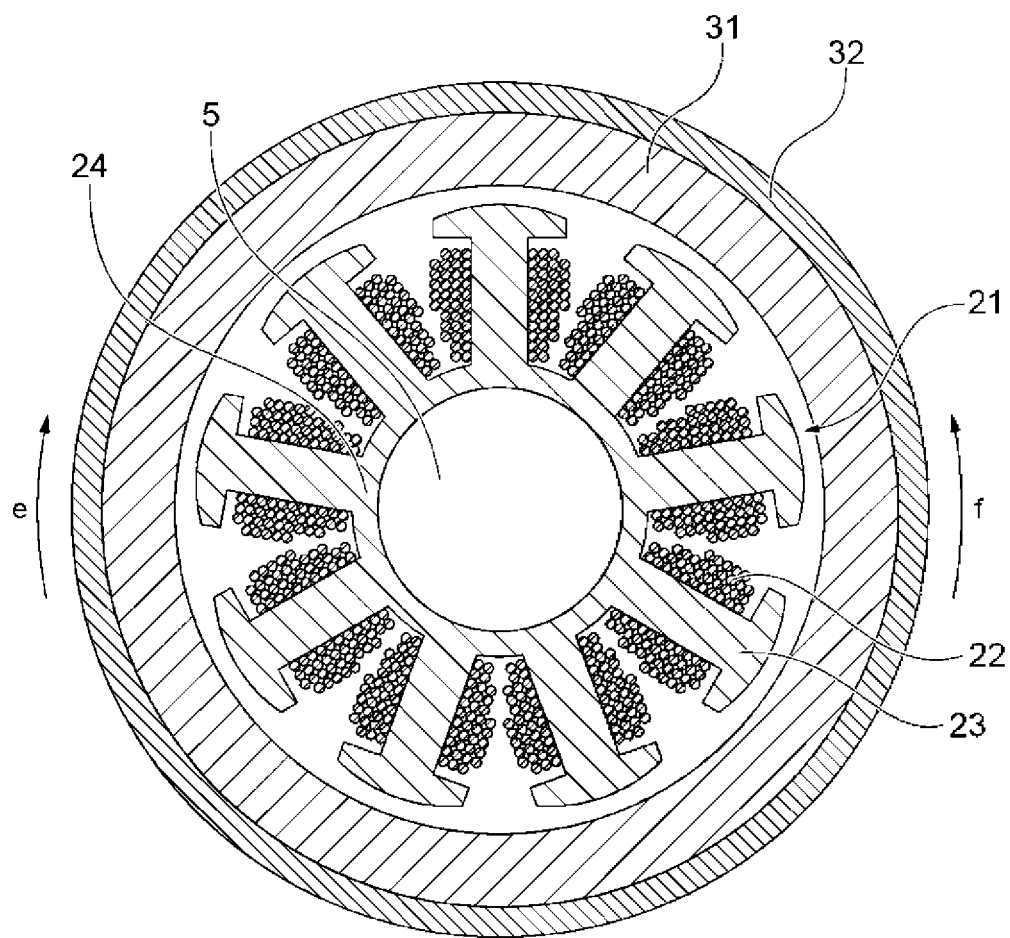
FIG. 2 is a horizontal cross-sectional view of the rotating device according to the first embodiment, which is an example of the present invention, and is a cross-sectional view taken along a line A-A in FIG. 1.

FIG. 1 is a vertical cross-sectional view of a rotating device 1 according to a first embodiment, which is an example of the present invention. FIG. 2 is a horizontal cross-sectional view of the rotating device 1, and corresponds to a cross-sectional view taken along a line A-A in FIG. 1.

Note that in a description of the present embodiment, an "upper side" and a "lower side" refer to an up and down relationship in FIG. 1, and do not necessarily correspond to an up and down relationship in the gravitational direction.

Furthermore, in an axial line x direction (hereinafter also referred to as the "axial direction"), a direction of an arrow a is an upper side a, and a direction of an arrow b is a lower side b. Further, in a direction perpendicular to the axial line x (hereinafter also referred to as a "radial direction"), a direction moving away from the axial line x (a direction of an arrow c) is referred to as an outer circumferential side c, and a direction approaching the axial line x (a direction of an arrow d) is referred to as an inner circumferential side d. Then, the clockwise direction in a circumferential direction (a circumferential direction viewed from the upper side a) centered about the axial line x is referred to as a circumferential direction e, and the counterclockwise direction in the circumferential direction is referred to as a circumferential direction f Note that the circumferential direction e and the circumferential direction f are illustrated in FIG. 2.

Further, in the description of the present embodiment, a part rotating inside the rotating device 1 may be referred to as a "rotating side", and a part that is fixed and supports members at the rotating side may be referred to as a "fixed side" or a "stationary part". Note that it is sufficient that the stationary part be stationary only in relation to the members at the rotating side.

The rotating device 1 according to the present embodiment includes a shaft member 5, a tubular rotor 3 rotatable with respect to the shaft member 5, an attached member 7 supporting the shaft member 5 by an end part at the upper side a and an end part at the lower side b in the axial line x direction, a bearing 4 supporting the rotor 3 with respect to the shaft member 5, and a stator 2 provided at the inner side of the rotor 3.

At the rotating device 1 according to the present embodiment, the shaft member 5 is fixed at the attached member 7. The attached member 7 is a target object for fixing the rotating device 1, and examples of the attached member 7 include a casing (a housing) of a rotating device such as a motor, and a device at which the rotating device is attached (such as an electronic device, an automobile as a moving body, and a frame or a substrate of a rotation device). The attached member 7 and the shaft member 5 are members at the fixed side.

The shaft member 5 and the attached member 7 are members relatively stationary with respect to the rotor 3 including a rotating body, which will be described below. Thus, these are collectively referred to as a stationary member (the stationary part). Note that as long as the stationary member (stationary part) is stationary with respect to the rotor 3, the stationary member (stationary part) itself need not necessarily be completely stationary, and may wobble due to rotation of the rotor 3. In other words, it is sufficient that the stationary member be relatively stationary with respect to the rotor 3. When the rotating device 1 is an attached member, the attached member 7 serves as a mounting member at which the attached member is attached.

The stator 2 is fixed at the shaft member 5, and includes a stator core 21 and a coil 22. The stator core 21 includes a magnetic pole part 23 extending radially toward the outer circumferential side c with the shaft member 5 serving as an axis, and the coil 22 is wound around the magnetic pole part 23.

Further, the stator core 21 is a stacked body of silicon steel sheets or the like, and is formed of an annular part 24 and a plurality of the magnetic pole parts 23. The annular part 24 is disposed coaxially with the shaft member 5 so as to surround the shaft member 5, and the plurality of magnetic pole parts 23 are formed so as to extend radially toward the outer circumferential side c from the annular part 24. The plurality of magnetic pole parts 23 are disposed and lined in the circumferential directions e and f. Further, the coil 22 is wound around each of the two adjacent magnetic pole parts 23.

The coil 22 is wound around each of the plurality of magnetic pole parts 23. The stator core 21 and the coils 22 are insulated by an insulator (not illustrated) formed of an insulating material. Note that, instead of the insulator, an insulating film may be coated at the surface of the stator core to insulate the stator core from the coils.

The rotor 3 includes a magnet 31 and a tubular rotating body 32. The magnet 31 opposes the magnetic pole parts 23 at the outer circumferential side of the stator 2, and is attached at the inner circumferential surface of the rotating body 32, directly or via another member such as an adhesive. Further, the rotating body 32 is formed of a single member.

The rotating body 32 has a tubular shape centered about the axis of the shaft member 5, and is in a state of surrounding the stator 2. The rotating body 32 also has a function of preventing leakage of a magnetic field from the inside of the rotating body 32, and is formed of a magnetic material or a non-magnetic material. When the rotating body 32 is formed of the non-magnetic material, the rotating body 32 does not form a magnetic circuit with the magnet 31, and thus, leakage of a magnetic flux to the outside can be suppressed. Examples of the non-magnetic material for forming the rotating body 32 include aluminum, plastic, ceramic, and the like.

Further, the material of the rotating body 32 is preferably a metal material. By forming the rotating body 32 from the metal material, heat generated from the stator 2 can be radiated and radiatively cooled. In other words, the heat of the stator 2 can be radiated to the outside and cooled as a result of the heat being transferred to the rotating body 32 via the shaft member 5 and the bearing 4. Further, by transferring heat of the magnet 31, received from the stator 2, to the rotating body 32, the heat can be radiated to the outside and cooled. Thus, aluminum can also be used as the material of the rotating body 32, the aluminum being a non-magnetic material and a metal member.

The rotating body 32 has a so-called vertically long shape having a length r in the radial direction (directions of the arrows c and d) smaller than a length q in the axial line x direction ($r<q$). By forming the rotating body 32 in the vertically long shape in this manner, the centrifugal force acting on the rotating body 32 can be reduced. As a result, high-speed rotation of the rotating device 1 can be achieved, and also, responsiveness to signals, such as activation, stop, and change in the rotational speed, can be improved.

In the present embodiment, an inner diameter t and the outer diameter r of the rotating body 32 are substantially the same in the axial direction from an end part of the rotating body 32 at a first bearing 41 side (the upper side a) to an end part of the rotating body 32 at a second bearing 42 side (the lower side b). As a result of the outer diameter of the rotating body 32 having substantially the same thickness over substantially the entire length, coaxiality can be improved, and thus, the high-speed rotation of the rotating device 1 and stabilization of the rotation can be achieved.

Note that "substantially" used herein is used with an intention to allow manufacturing errors of members themselves, ribs, holes, openings 33 and 34, which will be described below, and the like used for determining positions. When determining the dimension of the outer diameter, when the outer diameter can be said to be the same even with the presence of those elements, it is understood as "the outer diameter being substantially the same". The same applies when "substantially" is used below in relation to other members.

The magnet 31 is attached at the inner circumferential surface of the rotating body 32 so as to oppose the stator 2. The magnet 31 has an annular shape, and includes regions magnetized to the north pole and regions magnetized to the south pole, alternately provided along the circumferential direction at regular intervals. The magnet 31 may be an integrally molded product having the annular shape, or may be a plurality of magnets arranged and lined at the inner circumferential surface of the rotating body 32 so as to form a tubular shape.

The magnet 31 is formed of a resin. More specifically, the magnet 31 is formed by dispersing magnetic bodies in a binder resin, and being magnetized using a known method after molding. By forming the magnet 31 from the resin, weight reduction of the magnet 31, and consequently, of the rotor 3 can be achieved, and thus, the centrifugal force is reduced. As a result, the high-speed rotation of the rotating device 1 can be achieved, and also, the responsiveness to the signals, such as activation, stop, and change in the rotational speed, can be improved.

Note that even when the plurality of magnets are lined so as to form the tubular shape, in the present invention, those magnets are treated as a single magnet. In other words, in the present invention, "a plurality of magnets" refers to a state in which a plurality of the magnets each having a tubular shape (the magnet may be an integrally molded product, or may be constituted by a plurality of magnets being lined so as to form the tubular shape) are provided.

A predetermined magnetic gap G is provided between the magnet 31 and the stator 2. A plurality of the magnetic gaps G are arranged in the circumferential direction or the magnetic gap G is continuously arranged in the circumferential direction. Further, a predetermined clearance is provided between the magnet 31 and the stator 2 so that the magnetic gap G has at least a constant radial dimension.

The bearings 4 are disposed at both sides of the stator 2 in the axial direction of the shaft member 5, and include two bearings, namely, the first bearing 41 positioned at the upper side and the second bearing 42 positioned at the lower side. In other words, the magnet 31 and the stator 2 are positioned between the first bearing 41 and the second bearing 42 in the axial direction of the shaft member 5. The first bearing 41 and the second bearing 42 are members having the same configuration (the same shape, structure, size, and material). The first bearing 41 will be described below, but the same also applies to the second bearing 42.

The first bearing 41 is a so-called ball bearing including an outer circumferential ring 41a, an inner circumferential ring 41b, and a ball 41c interposed between the outer circumferential ring 41a and the inner circumferential ring 41b. The ball 41c rolls between the outer circumferential ring 41a and the inner circumferential ring 41b so that a rotational resistance of the inner circumferential ring 41b with respect to the outer circumferential ring 41a is significantly reduced. The first bearing 41 is formed, for example, from a hard metal such as iron, or a ceramic in consideration of its function.

The outer circumferential ring 41a of the first bearing 41 and an outer circumferential ring 42a of the second bearing 42 are fixed in contact with the inner circumferential surfaces of both end parts (a part at the first bearing 41 side and a part at the second bearing 42 side) of the rotating body 32. Further, the outer circumferential ring 41a of the first bearing 41 and the outer circumferential ring 42a of the second bearing 42 oppose the stator 2 in the axial direction of the shaft member 5. On the other hand, the inner circumferential ring 41b of the first bearing 41 and an inner circumferential ring 42b of the second bearing 42 are each fixed in contact with the outer circumferential surface of the shaft member 5. The inner circumferential ring 41b of the first bearing 41 and the inner circumferential ring 42b of the second bearing 42 oppose the magnet 31 in the axial direction of the shaft member 5.

Note that, in the present embodiment, the outer circumferential ring 41a of the first bearing 41 and the outer circumferential ring 42a of the second bearing 42 are directly in contact with the inner circumferential surface of the rotating body 32, and the inner circumferential ring 41b of the first bearing 41 and the inner circumferential ring 42b of the second bearing 42 are directly in contact with the outer circumferential surface of the shaft member 5. However, a separate member from the first bearing 41, the second bearing 42, and the shaft member 5, such as a ring-shaped member, may be interposed between the rings and the surfaces. This separate member may be the stationary member (stationary part) relatively stationary with respect to the first bearing 41, the second bearing 42, and the rotating body 32, in a similar manner to the shaft member 5, may rotate with respect to the shaft member 5, and may also rotate with respect to the first bearing 41, the second bearing 42, and the rotating body 32.

As a result, the rotor 3 is rotatable with respect to the shaft member 5. Further, the rotor 3 is configured to be rotatable about the axis of the shaft member 5 as a center axis. The outer circumferential surfaces of the first bearing 41 and the second bearing 42 are fixed in contact with the inner circumferential surface of both the end parts of the rotating body 32 in the same manner, and also, the inner circumferential surfaces of the first bearing 41 and the second bearing 42 are fixed in contact with the outer circumferential surface of both end parts of the shaft member 5 in the same manner. Thus, the coaxiality between the shaft member 5 and the rotor 3 is improved, and the high-speed rotation of the rotating device 1 and the stabilization of the rotation can be achieved.

As illustrated in FIG. 1, in the present embodiment, a radial dimension (hereinafter denoted by a symbol t as it is substantially the same as the inner diameter t of the rotating body 32) of the bearing 4 (the first bearing 41), which is a dimension of the bearing 4 in the radial direction, is larger than a radial dimension s, which is a dimension of the stator 2 in the radial direction (t>s).

The shaft member 5 is formed of a single member (in other words, a member substantially constituted by only a single component rather than a combination of a plurality of components forming a single member, and a coating film or the like covering the surface of the single component is included in the concept of the single member). By forming the shaft member 5 by the single member, the coaxiality can be increased, and thus, the high-speed rotation of the rotating device 1 and the stabilization of the rotation can be achieved. Further, the shaft member 5 is formed, for example, with aluminum into a hollow state (more specifically, into a tubular state) for weight reduction.

In the present embodiment, the shaft member 5 is a member at the fixed side (the stationary part). The shaft member 5 is a member having a function of fixing and supporting the rotating device 1 as a whole, and thus, is required to have a rigidity corresponding to the function. Therefore, the shaft member 5 may have a bending rigidity greater than a bending rigidity of the rotating body 32. Note that when a metal material is used as the material of the rotating body 32 for the purpose of heat dissipation, by also forming the shaft member 5 from a metal material, heat dissipation through heat transfer can be further increased.

In the present embodiment, the outer diameter of the shaft member 5 is substantially the same in the axial direction from a part, of the shaft member 5, opposing the first bearing 41 to a part, of the shaft member 5, opposing the second bearing 42. As a result of the outer diameter of the shaft member 5 being substantially the same thickness over substantially the entire length, the coaxiality can be increased, and thus, the high-speed rotation of the rotating device 1 and the stabilization of the rotation can be achieved.

An opening (not illustrated) is provided at a middle of the shaft member 5, and a lead wire (not illustrated) connected to the coil 22 is drawn from the opening into a cavity (not illustrated) inside of the shaft member 5, and pulled out of the rotating device 1 from an end part opening (not illustrated) of the shaft member 5 via the inside cavity.

In the rotating device 1 according to the present embodiment, the first bearing 41 and the second bearing 42 are enclosed (disposed) at both end part sides of the rotating body 32. Power is supplied from the outside to the coil 22 of the stator 2 in this enclosed space. Note that "being enclosed" used herein refers to a state in which openings at both end part sides of the rotating body 32 are blocked at least by the bearings, and may be a physically completely sealed state, or the inside and outside of the enclosed space need not necessarily be airtight with a gap provided at the bearing itself.

In the rotating device 1 according to the present embodiment, the lead wire is passed through the cavity inside the shaft member 5, thereby electrically connecting the inside of the space enclosed by the rotating body 32, the bearings 4, and the like, to the outside of the space. Therefore, the lead wire can power the coil 22 of the stator 2 provided inside the enclosed space.

In the rotating device 1 according to the present embodiment, openings 33, 34 penetrating the rotating body 32 from inside to outside are provided at the outer circumferential surface of the rotating body 32.

The openings (hereinafter referred to as "upper openings") 33 provided at the upper side a (the first bearing 41 side) in the axial line x direction are provided between the magnet 31 and the first bearing 41, and are six rectangular holes provided in a row in the circumferential direction at equal intervals, at the outer circumferential surface of the rotating body 32.

On the other hand, the openings (hereinafter referred to as "lower openings") 34 provided at the lower side b in the axial line x direction are provided between the magnet 31 and the second bearing 42, and like the upper openings 33, are six rectangular holes provided in a row in the circumferential direction at equal intervals, at the outer circumferential surface of the rotating body 32.

Note that the shape of the hole of the upper opening 33 and the lower opening 34 is not limited to the rectangular shape, and may be any shape such as square, circular, oval, or the like. Further, although examples are given above in which six upper openings 33 and six lower openings 34 are provided in a row in the circumferential direction, respectively, the number of holes and the number of rows may be arbitrarily chosen, and as long as at least one hole is formed, the function of an opening can be achieved.

In this way, as a result of the upper openings 33 and the lower openings 34 being provided at both sides in the axial line x direction with the magnet 31 and the stator 2 interposed between the upper openings 33 and the lower openings 34, an air flow is easily generated in which the air flows in from one side and flows out to the other side. Due to the air flow, the heat inside the rotating body 32 can be released to the outside, and thus, the stator 2 can be cooled.

In particular, as will be described below, when a blade is attached at the outer circumferential surface of the rotating body 32, and the rotating device 1 according to the present embodiment is caused to function as an air blower, due to the effect of the air flow flowing in the vicinity of the outer circumference of the rotating body 32, an air flow is generated in which the air actively flows in from one side and flows out to the other side. Thus, due to the air entering the inside of the rotating body 32 from those upper openings 33 and lower openings 34, the stator 2 can be efficiently cooled.

In the present embodiment, a plurality of the upper openings 33 and the lower openings 34 are provided, respectively, but even when one of the upper openings 33 and the lower openings 34 is provided, respectively, or even when only one of the openings is provided, the inside of the rotating body 32 can be communicated with the outside, and thus, a significant degree of the heat dissipation inside the rotating body 32 can be expected.

In the present embodiment, since the upper openings 33 are provided between the magnet 31 and the first bearing 41 in the axial direction, the upper openings 33 are in the vicinity of the magnet 31. Thus, deterioration of the magnet 31 can be suppressed (deterioration of the resin, demagnetization of the magnet itself, and the like. Hereinafter, the same applies when the deterioration of the magnet is discussed).

In the present embodiment, since the lower openings 34 are provided between the magnet 31 and the second bearing 42 in the axial direction, the lower openings 34 are in the vicinity of the magnet 31. Thus, the deterioration of the magnet 31 can be suppressed.

The rotating device 1 according to the present embodiment further includes rotor blades 6, 6' provided at the rotating body 32, that is, at the inner side of the rotating body 32. The rotor blades 6, 6' form a so-called impeller, and are members configured to actively generate an air flow from the upper side a toward the lower side b in the axial line x direction, inside the rotating body 32, using the rotation of the rotating body 32.

Due to the action of these rotor blades 6, 6', the air is actively introduced into the inside of the rotating body 32 from the upper openings 33, and is sent to the lower openings 34 to be discharged. Thus, as a result of the rotor blades 6, 6' being provided, the stator 2 can be cooled even more efficiently.

Note that the shape of the rotor blade 6, 6' may be a shape formed to act to suck the air from the upper openings 33, other than a shape formed to generate the air flow from the upper side a to the lower side b in the axial line x direction.

In the present embodiment, as illustrated in FIG. 1, a spacer 43 at the upper side a is provided between the rotor blade 6 at the upper side a (the first bearing 41 side) and the first bearing 41, so as to separate the first bearing 41 and the rotor blade 6 in the axial direction. Further, a spacer 44 at the lower side b is provided between the rotor blade 6' at the lower side b (the second bearing 42 side) and the second bearing 42, so as to separate the second bearing 42 and the rotor blade 6' in the axial direction.

The spacer 43 at the upper side a (the first bearing 41 side) covers one surface of the first bearing 41 in the axial direction, and serves as a cover. Further, the spacer 44 at the lower side b (the second bearing 42 side) covers one surface of the second bearing 42 in the axial direction, and serves as a cover.

Note that the spacers 43, 44 are optional components. Further, the spacers 43, 44 may be formed as part of the rotor blade 6, 6'.

Both end parts of the shaft member 5 are fitted into holes 71 provided at the attached member 7 and are fixed. A method for fixing both the end parts of the shaft member 5 at the attached member 7 is not particularly limited, and any of conventionally known bonding, fusing, welding, screwing, fastening, locking, or the like may be used. In particular, by causing the shaft member 5 to penetrate a hole of a donut-shaped fixing member 92 to become fixed with respect to an attached member 7a at the upper side a, and fixing this fixing member 92 to the lower side b of the attached member 7a, the shaft member 5 and the attached member 7a are fixed to each other.

A disc spring 91 is interposed between the lower surface of the fixing member 92 and the upper surface of the inner circumferential ring 41b of the first bearing 41. The disc spring 91 fixed in a state of being pressed from above by the fixing member 92 urges the inner circumferential ring 41b of the first bearing 41 downward. In other words, by the combination of the disc spring 91 and the fixing member 92, a preload acts on the inner circumferential ring 41b of the first bearing 41 in a direction toward the second bearing 42.

Due to the action of this preload, in a state of the first bearing 41 being loosely fitted with the shaft member 5 and the position of the inner circumferential ring 41b of the first bearing 41 being determined, the inner circumferential ring 41b of the first bearing 41 can be fixed at the shaft member 5 using an adhesive or the like.

Note that in the present embodiment, although an example is given in which the preload acts on the inner circumferential ring 41b of the first bearing 41 at the upper side a in the direction toward the second bearing 42, the same effect as the effect of the present embodiment is achieved even when a reverse configuration is adopted, namely, even when the preload acts on the inner circumferential ring 42b of the second bearing 42 at the lower side b in a direction toward the first bearing 41.

The rotating device 1 configured as described above constitutes a so-called outer rotor type brushless motor with the rotor 3 surrounding the stator 2 and rotatable with respect to the stator 2 fixed to the shaft member 5. However, in a typical outer rotor type brushless motor, a shaft fixed to a rotor rotates and a rotational force is extracted by the shaft, whereas in the rotating device 1 according to the present embodiment, the shaft member 5 having the axis coinciding with the center axis of the rotation of the rotor 3 is a member at the fixed side, and a configuration is adopted in which the rotational force is directly extracted from the rotor 3.

By forming the rotating body 32 by a single member, the center axes of the first bearing 41 and the second bearing 42 can be coaxial with the shaft member 5.

When the rotating body 32 is formed of a plurality of members, a plurality of tolerances with respect to the plurality of members constituting the rotating body 32, and to the first bearing 41 and the second bearing 42 may be considered. However, by forming the rotating body 32 by the single member, the number of tolerances to be considered can be reduced, and it becomes easier to coaxially align the center axes of the first bearing 41 and the second bearing 42 with the shaft member 5. By improving the coaxiality in this manner, the high-speed rotation of the rotating device 1 and the stabilization of the rotation can be achieved.

The attached member 7 is a member at which the rotating device 1 is fixed, and is formed of plastic, metal, or the like, for example. The attached member 7 is depicted in a flat plate shape in the drawings, but this is simply an example based on an assumption that a region around a section at which the rotating device 1 is attached is flat, and the attached member 7 may have various shapes depending on what the attached member 7 itself is. The region around the section where the rotating device 1 is attached need not necessarily be flat. Further, although locations where the attached member 7 is attached at the shaft member 5 are both ends of the shaft member 5 in the present embodiment, an aspect may be adopted with the attached member 7 being attached only at one end, such as only at a part at the upper side a in the axial line x direction.

In the rotating device 1 according to the present embodiment, the shaft member 5 is coaxially fixed at the attached member 7. Further, in the rotating device 1 according to the present embodiment, the shaft member 5 is coaxially fixed at the rotor 3 serving as a rotating body.

The rotating device 1 according to the present embodiment is configured so that the shaft member 5 is at the fixed side and the rotor 3 serving as a rotating body is rotated with respect to the shaft member 5 via the bearings 4. Thus, as illustrated in FIG. 1, the radial dimension s of the stator 2 can be made smaller than the radial dimension t of the bearing 4 (t>s). This allows the stator 2 to be made very small.

In a conventional outer rotor type brushless rotating device in which the rotor 3 and a shaft corresponding to the shaft member 5 are fixed and rotate together, a bearing must be disposed between a stator at the fixed side located inside a rotating body and the shaft, and thus, the radial dimension s of the stator inevitably becomes larger compared with the radial dimension t of the bearing 4 (t<s).

However, with the configuration of the present invention, it is possible to make the radial dimension s of the bearing smaller than the radial dimension t of the stator (t>s), or to make both the dimensions the same (t=s). Thus, downsizing of the rotating device as a whole can be achieved.

Further, when there is no need for the shaft member for extracting the rotational force to protrude from the rotating device, further downsizing and saving of space can be achieved.

Further, in a conventional rotating device including a rotating shaft member protruding from the rotating device, the shaft member rotates with one side of the shaft member being supported, and the rotational force is extracted from the protruding other end side. Thus, deviation of rotation is likely to occur. However, in the rotating device 1 according to the present embodiment, since the rotor 3 itself supported by the bearings 4 rotates as the rotating body, the rotation of the rotor 3 is stabilized.

Further, in the rotating device 1 according to the present embodiment, since the first bearing 41 and the second bearing 42 are fixed respectively to both the end part sides of the rotating body 32 and the rotating body 32 is supported, the rotation of the rotating body 32 is stabilized with respect to the shaft member 5. In particular, since the magnet 31, serving as a component of the rotor 3 together with the rotating body 32 and having a predetermined weight, is disposed, in the axial direction of the shaft member 5, between the first bearing 41 and the second bearing 42 rotatably supporting the rotating body 32, the rotation of the rotating body 32 is stabilized.

Note that although bearings are more preferably disposed at both end parts of a rotating body as in the present embodiment, as long as the bearings are disposed in the vicinity of both the end parts of the rotating body, the rotation of the rotating body with respect to the shaft member becomes sufficiently stable. "In the vicinity of" used herein refers to a position close to one of both end parts of the rotating body, and cannot be expressly defined by a numerical value. For example, a region within a length of 20% from one of both ends in the axial direction of the rotating body, or more preferably, a region within a length of 10% from one of both the ends is included in the concept of "both end part sides".

Further, in the rotating device 1 according to the present embodiment, the two rotor blades 6, 6' oppose parts of the first bearing 41 and the second bearing 42 in the axial direction of the shaft member 5, respectively. By disposing the rotor blades 6, 6' in this manner, the air flow can be generated in the space inside the rotating body 32 over a long section in the axial direction, and the space inside the rotating body 32 can be efficiently cooled.

Furthermore, in the rotating device 1 according to the present embodiment, since the first bearing 41 and the second bearing 42 are members having the same configuration, the rotation of the rotor 3 is stabilized.

As described above, in the rotating device 1 according to the present embodiment, deviation of rotation of the rotor 3 is unlikely to occur, and thus, stabilization can be achieved in a highly precise manner.

The stabilization of the rotation of the rotor 3 means that uneven rotation is less likely to occur, and thus, the rotating device 1 can also be made to generate a higher torque. In other words, the rotating device 1 according to the present embodiment can provide excellent basic characteristics as a rotating device, while achieving downsizing.

Further, in the present embodiment, the single stator 2 is disposed in a central part C1 of the shaft member 5 in the axial direction. Thus, the rotating device 1 as a whole can have the center of gravity substantially at the center in the axial direction, and thus, the weight balance can be secured. Further, the weight can be uniformly distributed in the axial direction. Thus, the high-speed rotation of the rotating device 1 and the stabilization of the rotation can be achieved.

Furthermore, in the present embodiment, the single magnet 31 is disposed in a central part C2 of the rotating body 32 in the axial direction. Therefore, the rotor 3 as a whole can have the center of gravity substantially at the center in the axial direction, the rotor 3 being a member at the rotating side, and thus, the weight balance can be secured. Further, the weight can be uniformly distributed in the axial direction. Thus, the high-speed rotation of the rotating device 1 and the stabilization of the rotation can be achieved.

Second Embodiment

Next, a rotating device 1a according to a second embodiment will be described as an example of the present invention with reference to the drawings.

Figure 3:
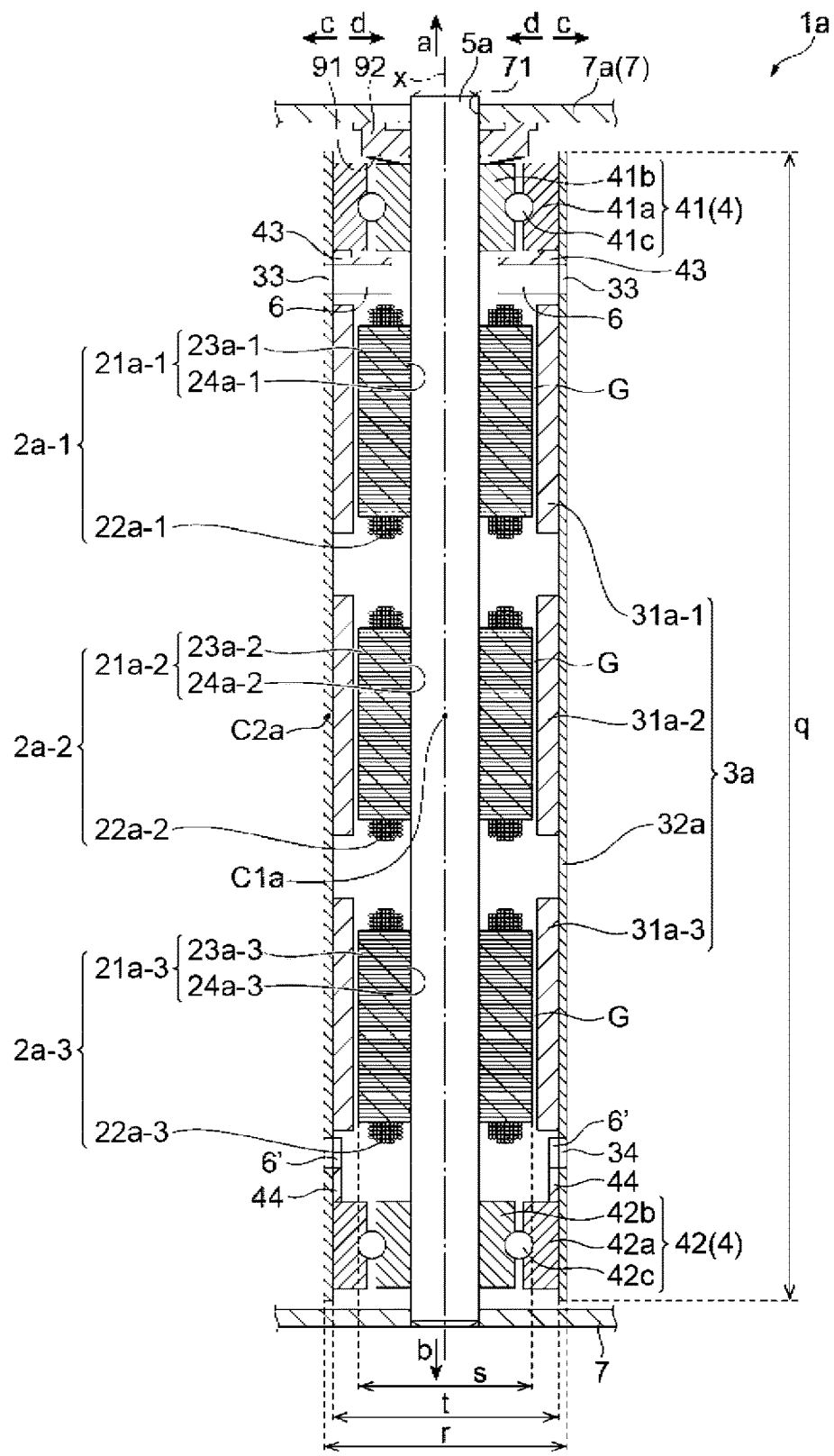
FIG. 3 is a vertical cross-sectional view of a rotating device according to a second embodiment, which is an example of the present invention.

FIG. 3 is a vertical cross-sectional view of the rotating device 1a according to the second embodiment, as the example of the present invention. FIG. 3 is a vertical cross-sectional view taken along a cross section at substantially the same position as FIG. 1. In a description of the present embodiment, members or components having the same function and structure as the function and structure of the above-described embodiment are denoted by the same reference signs as the reference signs of the above-described embodiment in FIG. 3, and detailed descriptions of those members and components are omitted (unless a particular description is added).

In the present embodiment, three sets of stators and magnets are disposed in the axial direction so that the stator and the magnet form a pair while opposing each other. As illustrated in FIG. 3, in the axial direction (the axial line x direction), three stators 2a-1, 2a-2, 2a-3 (hereinafter these may also be referred to as the "first stator 2a-1", the "second stator 2a-2", and the "third stator 2a-3" in order as necessary) are disposed and lined at a shaft member 5a at equal intervals. Each of the stators 2a-1, 2a-2, 2a-3 has the same configuration as the configuration of the stator 2 in the first embodiment. Further, the shaft member 5a has the same configuration as the configuration of the shaft member 5 in the first embodiment, except that the length of the shaft member 5a in the axial direction is longer.

On the other hand, in the present embodiment, as illustrated in FIG. 3, in the axial direction (the axial line x direction), three magnets 31a-1, 31a-2, 31a-3 (hereinafter these may also be referred to as the "first magnet 31a-1", the "second magnet 31a-2", and the "third magnet 31a-3" in order as necessary) are disposed and lined at the inner circumferential surface of a rotating body 32a at equal intervals. Each of the magnets 31a-1, 31a-2, 31a-3 has the same configuration as the configuration of the magnet 31 in the first embodiment. Further, the rotating body 32a has the same configuration as the configuration of the rotating body 32 in the first embodiment, except that the length of the rotating body 32a in the axial direction (more specifically, the length between the openings 33 and the openings 34) is longer.

In this way, in the present embodiment, as a result of the plurality of sets (three sets) of the stators 2a-1, 2a-2, 2a-3 and the magnets 31a-1, 31a-2, 31a-3 being disposed in the axial direction, one or both of the improvement in torque and high-speed rotation of the rotating device 1a can be achieved.

Further, in the present embodiment, of the three stators, the central second stator 2a-2 is fixed to a central part C1a of the shaft member 5a in the axial direction. Thus, the rotating device 1a as a whole can have the center of gravity substantially at the center in the axial direction, and thus, the weight balance can be secured. Further, the weight can be uniformly distributed in the axial direction. Thus, the high-speed rotation of the rotating device 1a and the stabilization of the rotation can be achieved.

Furthermore, in the present embodiment, of the three magnets, the central second magnet 31a-2 is fixed to a central part C2a of the rotating body 32a in the axial direction. Thus, a rotor 3a as a whole can have the center of gravity substantially at the center in the axial direction, the rotor 3a being a member at the rotating side, and thus, the weight balance can be secured. Further, the weight can be uniformly distributed in the axial direction. Thus, the high-speed rotation of the rotating device 1a and the stabilization of the rotation can be achieved.

In the present embodiment, a coil 22a-1 provided at the first stator 2a-1, a coil 22a-2 provided at the second stator 2a-2, and a coil 22a-3 provided at the third stator 2a-3 are electrically connected in parallel in this order. By connecting the coils 22a-1, 22a-2, 22a-3 in parallel in this manner, an overall resistance value of a coil constituted by the plurality of coils 22a-1, 22a-2, 22a-3 can be reduced, and accordingly, generated Joule heat is reduced. Thus, even when the rotating device 1a is rotated at high speed, an amount of the heat generated can be suppressed.

Note that in the same manner as in the first embodiment, a lead wire (not illustrated) at both end parts of the coils 22a-1, 22a-2, 22a-3 with the coil 22a-1, the coil 22a-2, and the coil 22a-3 connecting in parallel is drawn into a cavity (not illustrated) inside the shaft member 5a from an opening (not illustrated) provided at a middle of the shaft member 5a and pulled out from an end part opening (not illustrated) of the shaft member 5a to the outside of the rotating device 1a via the inside cavity.

In the present embodiment, since the upper openings 33 are provided between the first magnet 31a-1 and the first bearing 41 in the axial direction, the upper openings 33 are in the vicinity of the first magnet 31a-1. Thus, deterioration of the first magnet 31a-1 can be suppressed.

Further, in the present embodiment, since the lower openings 34 are provided between the third magnet 31a-3 and the second bearing 42 in the axial direction, the lower openings 34 are in the vicinity of the third magnet 31a-3. Thus, deterioration of the third magnet 31a-3 can be suppressed.

Further, in the present embodiment, since the three stators 2a-1, 2a-2, 2a-3 are located between the upper openings 33 and the lower openings 34 in the axial direction, an air flow introduced from the upper openings 33 comes into contact and exchanges heat with all of the stators 2a-1, 2a-2, 2a-3 before being released from the lower openings 34. Thus, these stators 2a-1, 2a-2, 2a-3 can be cooled efficiently.

In the present embodiment, the rotating body 32a has a so-called vertically long shape having the length r in the radial direction (directions of the arrows c and d) smaller than the length q in the axial line x direction ($r<q$). By forming the rotating body 32a in the vertically long shape in this manner, the centrifugal force is reduced. Thus, the high-speed rotation of the rotating device 1a can be achieved, and also, the responsiveness to the signals, such as activation, stop, and change in the rotational speed, can be improved.

In the present embodiment, compared with the first embodiment, the length r is even smaller than the length q ($r\ll q$). Thus, the centrifugal force reducing effect can be achieved to a greater extent, and further, the high-speed rotation of the rotating device 1a and the improvement in the above-described responsiveness to the various signals can be expected to be achieved at an even higher level.

In the present embodiment, the inner diameter t and the outer diameter r of the rotating body 32a are substantially the same in the axial direction from an end part of the rotating body 32a at the first bearing 41 side (the upper side a) to an end part of the rotating body 32a at the second bearing 42 side (the lower side b). As a result of the outer diameter of the rotating body 32a being substantially the same thickness over substantially the entire length, the coaxiality can be increased, and thus, the high-speed rotation of the rotating device 1a and the stabilization of the rotation can be achieved.

In the present embodiment, the outer diameter of the shaft member 5a is substantially the same in the axial direction from a part, of the shaft member 5a, opposing the first bearing 41 to a part, of the shaft member 5a, opposing the second bearing 42. As a result of the outer diameter of the shaft member 5a being substantially the same thickness over substantially the entire length, the coaxiality can be increased, and thus, the high-speed rotation of the rotating device 1a and the stabilization of the rotation can be achieved.

As a modified example of the present embodiment, an example can be given where the number of stators and magnets disposed in a row in the axial direction is an odd number greater than three (five, seven, or the like, for example). Even when the number of stators and magnets increases, the same effect as the effect of the present embodiment can be expected. In other words, as a result of the plurality of stators being disposed and lined at the shaft member at equal intervals in the axial direction, one of the stators (the central one in particular) being disposed at the central part of the shaft member, the plurality of magnets being disposed and lined at the shaft member at equal intervals in the axial direction (the axial line x direction), and one of the magnets (the central one in particular) being disposed at the central part of the shaft member, the same effect as the effect of the present embodiment can be expected.

Third Embodiment

Next, a rotating device 1b according to a third embodiment will be described as an example of the present invention with reference to the drawings.

Figure 4:
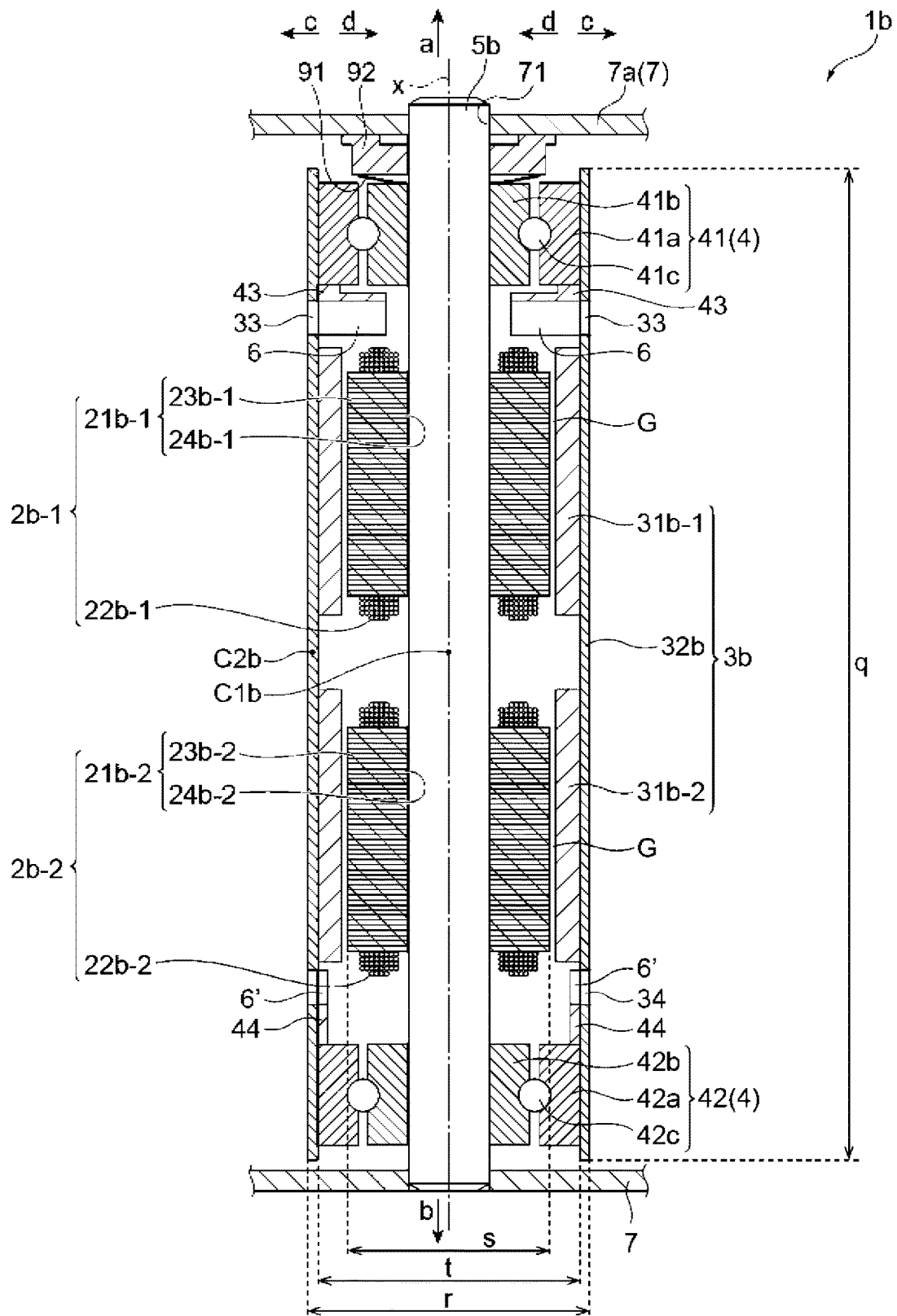
FIG. 4 is a vertical cross-sectional view of a rotating device according to a third embodiment, which is an example of the present invention.

FIG. 4 is a vertical cross-sectional view of the rotating device 1b according to the third embodiment, as the example of the present invention. FIG. 4 is a vertical cross-sectional view taken along a cross section at substantially the same position as FIG. 1. In a description of the present embodiment, members or components having the same function and structure as the function and structure of the above-described embodiment are denoted by the same reference signs as the reference signs of the above-described embodiment in FIG. 4, and detailed descriptions of those members and components are omitted (unless a particular description is added).

In the present embodiment, two sets of stators and magnets are disposed in the axial direction so that the stator and the magnet form a pair while opposing each other. As illustrated in FIG. 4, in the axial direction (the axial line x direction), two stators 2b-1, 2b-2 (hereinafter these may also be referred to as the "first stator 2b-1" and the "second stator 2b-2" in order as necessary) are disposed and lined at a shaft member 5b. Each of the stators 2b-1, 2b-2 has the same configuration as the configuration of the stator 2 in the first embodiment. Further, the shaft member 5b has the same configuration as the configuration of the shaft member 5 in the first embodiment, except that the length of the shaft member 5b in the axial direction is longer.

On the other hand, in the present embodiment, as illustrated in FIG. 4, in the axial direction (the axial line x direction), two magnets 31b-1, 31b-2 (hereinafter these may also be referred to as the "first magnet 31b-1" and the "second magnet 31b-2" in order as necessary) are disposed and lined at the inner circumferential surface of a rotating body 32b. Each of the magnets 31b-1, 31b-2 has the same configuration as the magnet 31 in the first embodiment. Further, the rotating body 32b has the same configuration as the configuration of the rotating body 32 in the first embodiment, except that the length of the rotating body 32b in the axial direction (more specifically, the length between the openings 33 and the openings 34) is longer.

In this way, in the present embodiment, as a result of the plurality of sets (two sets) of the stators 2b-1, 2b-2 and the magnets 31b-1, 31b-2 being disposed in the axial direction, one or both of the improvement in torque and high-speed rotation of the rotating device 1b can be achieved.

Further, in the present embodiment, the two stators 2b-1, 2b-2 are fixed at both sides of a central part C1b of a shaft member 5b in the axial direction. Thus, the rotating device 1b as a whole can have the center of gravity substantially at the center in the axial direction, and thus, the weight balance can be secured. Further, the weight can be uniformly distributed in the axial direction. Thus, the high-speed rotation of the rotating device 1b and the stabilization of the rotation can be achieved.

Furthermore, in the present embodiment, the two magnets 31b-1, 31b-2 are fixed at both sides of a central part C2a of the rotating body 32b in the axial direction. Thus, a rotor 3b as a whole can have the center of gravity substantially at the center in the axial direction, the rotor 3b being a member at the rotating side, and thus, the weight balance can be secured. Further, the weight can be uniformly distributed in the axial direction. Thus, the high-speed rotation of the rotating device 1b and the stabilization of the rotation can be achieved.

In the present embodiment, a coil 22b-1 provided at the first stator 2b-1 and a coil 22b-2 provided at the second stator 2b-2 are electrically connected in parallel. By connecting the coils in parallel in this manner, an overall resistance value of a coil constituted by the plurality of coils 22b-1, 22b-2 can be reduced, and accordingly, the generated Joule heat is reduced. Thus, even when the rotating device 1b is rotated at high speed, an amount of the heat generated can be suppressed.

Note that in the same manner as in the first embodiment, a lead wire (not illustrated) at both end parts of the coils 22b-1, 22b-2 with the coils 22b-1 and the coil 22b-2 connecting in parallel is drawn into a cavity (not illustrated) inside the shaft member 5b from an opening (not illustrated) provided at a middle of the shaft member 5b, and pulled out from an end part opening (not illustrated) of the shaft member 5b to the outside of the rotating device 1b via the inside cavity.

In the present embodiment, since the upper openings 33 are provided between the first magnet 31b-1 and the first bearing 41 in the axial direction, the upper openings 33 are in the vicinity of the first magnet 31b-1. Thus, deterioration of the first magnet 31b-1 can be suppressed.

Further, in the present embodiment, since the lower openings 34 are provided between the second magnet 31b-2 and the second bearing 42 in the axial direction, the lower openings 34 are in the vicinity of the second magnet 31b-2. Thus, deterioration of the magnet 31b-2 can be suppressed.

Thus, in the present embodiment, both the magnets 31b-1 and 31b-2 can be efficiently cooled, and thus, the deterioration of the magnets 31b-1, 31b-2 can be suppressed.

Further, in the present embodiment, since the two stators 2b-1, 2b-2 are located between the upper openings 33 and the lower openings 34 in the axial direction, the air flow introduced from the upper openings 33 comes into contact and exchanges heat with all of the stators 2b-1, 2b-2 before being released from the lower openings 34. Thus, these stators 2b-1, 2b-2 can be cooled efficiently.

In the present embodiment, the rotating body 32b has the so-called vertically long shape having the length r in the radial direction (directions of the arrows c and d) smaller than the length q in the axial line x direction (r<q). By forming the rotating body 32b in the vertically long shape in this manner, the centrifugal force is reduced. Thus, the high-speed rotation of the rotating device 1b can be achieved, and also, the responsiveness to the signals, such as activation, stop, and change in the rotational speed, can be improved.

In the present embodiment, compared with the first embodiment, the length r is even smaller than the length q (r<<q). Thus, the centrifugal force reducing effect can be achieved to a greater extent, and further, the high-speed rotation of the rotating device 1b and the improvement in the above-described responsiveness to the various signals can be expected to be achieved at an even higher level.

In the present embodiment, the inner diameter t and the outer diameter r of the rotating body 32b are substantially the same in the axial direction from an end part of the rotating body 32b at the first bearing 41 side (the upper side a) to an end part of the rotating body 32b at the second bearing 42 side (the lower side b). As a result of the outer diameter of the rotating body 32b being substantially the same thickness over substantially the entire length, the coaxiality can be increased, and thus, the high-speed rotation of the rotating device 1b and the stabilization of the rotation can be achieved.

In the present embodiment, the outer diameter of the shaft member 5b is substantially the same in the axial direction from a part, of the shaft member 5b, opposing the first bearing 41 to a part, of the shaft member 5b, opposing the second bearing 42. As a result of the outer diameter of the shaft member 5b being substantially the same thickness over substantially the entire length, the coaxiality can be increased, and thus, the high-speed rotation of the rotating device 1b and the stabilization of the rotation can be achieved.

As a modified example of the present embodiment, an example can be given in which the number of stators and magnets disposed in a row in the axial direction is an even number greater than two (four, six, or the like, for example). Even when the number of stators and magnets increases, the same effect as the effect of the present embodiment can be expected. In other words, as a result of the plurality of stators being disposed and lined at the shaft member at equal intervals in the axial direction, two of the stators (two at the center in particular) being disposed at both sides of the central part of the shaft member, the plurality of magnets being disposed and lined at the shaft member at equal intervals in the axial direction (the axial line x direction), and two of the magnets (two at the center in particular) being disposed at both sides of the central part of the shaft member, the same effect as the effect of the present embodiment can be expected.

As described above, the rotating device according to the present invention is described with reference to preferred embodiments, but the rotating device according to the present invention is not limited to the configurations of the embodiments described above. For example, in each of the embodiments described above, only an example is described in which the number of rotor blades 6, 6' is two, but only one of the rotor blades, or a plurality of, namely, three or more of the rotor blades may be provided. In consideration of the cooling efficiency of the stator, it may be preferable that the plurality of rotor blades be provided. By disposing the plurality of rotor blades between the first bearing and the second bearing in the axial direction of the shaft member, the air flow can be efficiently generated inside the rotating body over a long section in the axial direction.

Note that in the present invention, the rotor blades refer to respective members disposed and lined in the axial direction, and do not refer to individual blades, for example, arranged radially in the circumferential direction at one position in the axial direction. In this case, a collection of those blades forms a single "rotor blade". Thus, even if there are a number of blades at one position in the axial direction, it is considered to be a single rotor blade.

When the plurality of rotor blades are provided, the stator is preferably disposed between the plurality of rotor blades in the axial direction of the shaft member. By disposing the stator between the plurality of rotor blades, the cooling efficiency of the stator can be improved.

Further, in each of the embodiments described above, an example is given where the openings are provided at two upper and lower rows (the upper openings 33 and the lower openings 34), but the number of openings is not limited to two rows, and may be one row or three or more rows. For example, in the second embodiment, by forming an opening at the rotating body 32a at a region at the upper side a or the lower side b of the central magnet 31a-2, the opening is in the vicinity of the magnet 31a-2, and thus, deterioration of the magnet 31a-2 can be suppressed. In this way, when there are a plurality of magnets, by forming an opening in the vicinity of each of the magnets, deterioration of each of the magnets can be suppressed.

When a plurality of the openings are provided in the axial direction, the rotor blades corresponding to the respective openings are preferably provided. Due to the action of the rotor blades, air intake and exhaust can be actively performed for each of the openings, thereby forming an air flow efficiently, and accordingly, the cooling efficiency can be improved. For example, an aspect may be adopted in which one half of the rotor blade in the axial direction is used as a rotor blade for air intake (a rotor blade disposed at an intake port side), and another half of the rotor blade is used as a rotor blade for air exhaust (a rotor blade disposed at an exhaust port side).

In the rotating device according to the embodiment described above, the first bearing 41 and the second bearing 42 are fixed respectively to both the end parts of the rotating body, but the configuration is not limited to this example. With respect to both end parts of the rotating body 32, 32a, 32b, the first bearing 41 may be fixed to one part of the rotating body 32, 32a, 32b on the side of the magnet 31, 31a-1, 31a-3, and the second bearing 42 may be fixed to another part of the rotating body 32, 32a, 32b. Even when such an aspect is adopted, the rotating body 32, 32a, 32b is supported, and thus, the rotation of the rotor 3, 3*a*, 3*b* with respect to the shaft member 5, 5*a*, 5*b* is stabilized.

An example is given above where both the outer circumferential surfaces of the first bearing 41 and the second bearing 42 and the inner circumferential surface of the rotating body 32, and the inner circumferential surfaces of the first bearing 41 and the second bearing 42 and the outer circumferential surface of the shaft member 5 are fixed in direct contact, but they may be indirectly fixed to each other with a member interposed between the surfaces.

As described above, the rotating body may include two end parts in the axial direction of the shaft member, the first bearing may be fixed to one part of the rotating body at one end part side of the two end parts, and the second bearing may be fixed to another part of the rotating body at the other end part side of the two end parts.

As described above, the rotating device according to the present invention is different from the typical outer rotor type brushless motor where the shaft fixed to the rotor rotates, and is configured so that the shaft member is a member at the fixed side, and the rotational force is directly extracted from the rotor (including the rotating body), the rotor being a member at the rotating side. Thus, for example, in the rotating device according to the present invention, by attaching blades to the outer circumferential surface of the rotating body in a radial manner, a so-called air blowing device can be provided. Then, by using, for example, a tubular housing as the attached member 7 described in the embodiment described above, a small, high performance air blowing device can be obtained.

In addition, the rotating device according to the present invention may be appropriately modified by a person skilled in the art according to conventionally known knowledge. Such modifications are of course included in the scope of the present invention as long as these modifications still include the configuration of the present invention.

REFERENCE SIGNS LIST

1 Rotating device
2 Stator
2*a*-1 First stator (stator)
2*a*-2 Second stator (stator)
2*a*-3 Third stator (stator)
3 Rotor
4 Bearing
5, 5*a*, 5*b* Shaft member
6, 6' Rotor blade
7, 7*a* Attached member
21, 21*a*-1, 21*a*-2, 21*a*-3 Stator core
22, 22*a*-1, 22*a*-2, 22*a*-3 Coil
23, 23*a*-1, 23*a*-2, 23*a*-3 Magnetic pole part
24, 24*a*-1, 24*a*-2, 24*a*-3 Annular part
31 Magnet
31*a*-1 First magnet (magnet)
31*a*-2 Second magnet (magnet)
31*a*-3 Third magnet (magnet)
32 Rotating body
32*a* Rotating body
32*b* Rotating body
33 Upper opening (opening)
34 Lower opening (opening)
41 First bearing (bearing)
41*a*, 42*a* Outer circumferential ring
41*b*, 42*b* Inner circumferential ring
41*c*, 42*c* Ball
42 Second bearing (bearing)
43, 44 Spacer
71 Hole
91 Disc spring
92 Fixing member

The invention claimed is:

1. A rotating device comprising:
a shaft member as a stationary part;
a tubular rotating body rotatable with respect to the shaft member;
a first bearing and a second bearing supporting the rotating body with respect to the shaft member;
a single stator or a plurality of stators provided at an inner side of the rotating body;
a single tubular magnet or a plurality of tubular magnets fixed at an inner circumferential surface of the rotating body;
a single rotor blade or a plurality of rotor blades provided at a part of the rotating body extending in an axial direction of the shaft member;
a single opening or a plurality of openings provided through the part of the rotating body extending in the axial direction of the shaft member; and
a spacer arranged between the first bearing and the single rotor blade or one of the plurality of rotor blades in the axial direction of the shaft member;
wherein
the part of the rotating body is defined between the first bearing and the magnet in the axial direction,
the magnet is formed of a resin,
a length of the rotating body in a radial direction is shorter than a length of the rotating body in the axial direction of the shaft member,
inner circumferential surfaces of the first bearing and the second bearing are fixed at an outer circumferential surface of the shaft member,
the shaft member and the rotating body are each formed of a single member,
an outer diameter of the shaft member is substantially the same in the axial direction of the shaft member from a part, of the shaft member, opposing the first bearing to a part, of the shaft member, opposing the second bearing,
an inner diameter and an outer diameter of the rotating body are each substantially the same in the axial direction of the shaft member from an end part of the rotating body on the first bearing side to an end part of the rotating body on the second bearing side,
the single stator or one of the plurality of stators is disposed at a central part of the shaft member in the axial direction of the shaft member,
the single magnet or one of the plurality of magnets is disposed at a central part of the rotating body in the axial direction of the shaft member,
the first bearing and the second bearing are disposed at both the end part sides of the rotating body,
the single rotor blade or one of the plurality of rotor blades is arranged on the inner side of the part of the rotating body and arranged immediately adjacent the single opening or position of one of the plurality of openings in the axial direction of the shaft member, and
the single opening or the plurality of openings penetrates the part of the rotating body from inside to outside in the radial direction,
wherein the single rotor blade or the one of the plurality of rotor blades is positioned between the single opening or the one of the plurality of openings and the shaft in the radial direction, wherein the spacer covers a surface of the first bearing, and wherein the spacer is formed as part of the single rotor blade or the one of the plurality of rotor blades.

2. The rotating device according to claim 1, wherein the stator is disposed between the plurality of rotor blades in the axial direction of the shaft member.

3. The rotating device according to claim 1, wherein a part of the single rotor blade or the one of the plurality of rotor blades opposes the first bearing in the axial direction of the shaft member.

4. The rotating device according to claim 1, wherein the rotor blade is disposed between the first bearing and the second bearing in the axial direction of the shaft member.

5. The rotating device according to claim 1, wherein outer circumferential surfaces of the first bearing and the second bearing are fixed at an inner circumferential surface of the rotating body.

6. The rotating device according to claim 1, wherein the rotating body is formed of a member made of a non-magnetic material.

7. The rotating device according to claim 1, wherein the rotating body is formed of a metal member.

8. The rotating device according to claim 1, wherein the number of the plurality of stators and the number of the plurality of magnets are each an odd number, the plurality of stators are lined at the shaft member in the axial direction of the shaft member at equal intervals, one of the plurality of stators being disposed at the central part of the shaft member, and the plurality of magnets are lined at the rotating body in the axial direction of the shaft member at equal intervals, one of the plurality of magnets being disposed at the central part of the rotating body.

9. The rotating device according to claim 1, wherein the number of the stators is a plurality, and coils of the plurality of stators are electrically connected in parallel.

10. The rotating device according to claim 1, wherein the one of the plurality of openings is provided between the magnet and the first bearing in the axial direction of the shaft member.

11. The rotating device according to claim 10, wherein the plurality of openings are provided at the outer circumferential surface of the rotating body, and another one of the plurality of openings is provided between the magnet and the second bearing in the axial direction of the shaft member.

12. The rotating device according to claim 1, wherein a preload acts on an inner circumferential ring of one of the first bearing and the second bearing in a direction toward the other of the first bearing and the second bearing, the inner circumferential ring being fixed at the shaft member.

13. The rotating device according to claim 1, wherein two of the plurality of stators are disposed at both sides of a central part of the shaft member in the axial direction of the shaft member, two of the plurality of magnets are disposed at both sides of a central part of the rotating body extending in the axial direction of the shaft member, and the first bearing and the second bearing are disposed at both the end part sides of the rotating body.

14. The rotating device according to claim 13, wherein coils of the plurality of stators are electrically connected in parallel.

15. The rotating device according to claim 1, comprising:
a second rotor blade attached at the outer circumferential surface of the rotating body, the single rotor blade being a first single rotor blade or the plurality of rotor blades arranged at the inner side of the part of the rotating body being first rotor blades.

16. A rotating device comprising:
a shaft member as a stationary part;
a tubular rotating body rotatable with respect to the shaft member;
a first bearing and a second bearing supporting the rotating body with respect to the shaft member;
a single stator or a plurality of stators provided at an inner side of the rotating body;
a single tubular magnet or a plurality of tubular magnets fixed at an inner circumferential surface of the rotating body;
a single rotor blade or a plurality of rotor blades provided at a part of the rotating body extending in an axial direction of the shaft member;
a single opening or a plurality of openings penetrating the rotating body from inside to outside are provided through the part of the rotating body extending in the axial direction of the shaft member; and
a spacer arranged between the first bearing and the single rotor blade or one of the plurality of rotor blades in the axial direction of the shaft member;
wherein
the part of the rotating body is defined between the first bearing and the magnet in the axial direction,
the single rotor blade or one of the plurality of rotor blades is arranged on the inner side of the part of the rotating body and arranged immediately adjacent the single opening or position of one of the plurality of openings in the axial direction of the shaft member, and the single opening or the plurality of openings penetrates the part of the rotating body from inside to outside in a radial direction,
wherein the single rotor blade or the one of the plurality of rotor blades is positioned between the single opening or the one of the plurality of openings and the shaft in the radial direction,
wherein the spacer covers a surface of the first bearing, and
wherein the spacer is formed as part of the single rotor blade or the one of the plurality of rotor blades.

17. The rotating device according to claim 16, wherein the stator is disposed between the plurality of rotor blades in the axial direction of the shaft member.

18. The rotating device according to claim 16, wherein the rotor blade is disposed between the first bearing and the second bearing in the axial direction of the shaft member.

19. The rotating device according to claim 16, wherein the one of the plurality of openings is provided between the magnet and the first bearing in the axial direction of the shaft member.

20. The rotating device according to claim 19, wherein the plurality of openings are provided at the outer circumferential surface of the rotating body, and another one of the plurality of openings is provided between the magnet and the second bearing in the axial direction of the shaft member.

21. The rotating device according to claim 15, comprising:
a second opening provided through the part of the rotating body extending in the axial direction of the shaft member, the second opening being spaced a distance apart from the first opening along the axial direction of the shaft member;

wherein the second rotor blade is arranged immediately adjacent the second opening and is positioned between the second opening and the shaft in the radial direction.

* * * * *